United States Patent Office 3,404,114
Patented Oct. 1, 1968

3,404,114
METHOD FOR PREPARING LATEXES HAVING
IMPROVED ADHESIVE PROPERTIES
Walter C. Snyder, Freeport, and Fred C. Wright, Kerrville, Tex., assignors to The Dow Chemical Company, Midland, Mich., a corporation of Delaware
No Drawing. Filed June 18, 1965, Ser. No. 465,155
9 Claims. (Cl. 260—29.6)

ABSTRACT OF THE DISCLOSURE

This application is concerned with an emulsion polymerization process for preparing interpolymers of from 1 to 25% of an unsaturated carboxylic acid from 50–98% of a monovinylidene monomer and from 1–25% of an alkyl amino alkyl ester of an unsaturated acid, the process comprising the sequential steps of heating an aqueous phase containing a polymerization catalyst and an emulsifier, then adding the unsaturated carboxylic acid and at least a portion of the monovinylidene monomer thereafter adding a nitrogenous alkaline compound to provide a pH of at least 7 and finally adding the alkyl amino alkyl ester of the unsaturated monomer and any remaining portion of the monovinylidene monomers.

---

This invention relates to an improved process for aqueous emulsion polymerization to produce stable latexes. It particularly concerns the preparation of stable latexes when deposited and dried on a substrate yield polymer films which adhere tenaciously thereto.

In the well known art of emulsion polymerization, a monomeric liquid composition comprising a polymerizable ethylenically unsaturated compound is colloidally emulsified in an aqueous medium that usually contains a wetting agent and a polymerization catalyst. The resulting colloidal emulsion is then subjected to conditions conducive to polymerization of the monomeric constituents to produce an aqueous colloidal dispersion of the corresponding polymeric product. That latter colloidal dispersion is commonly referred to as a latex.

In recent years synthetic latexes prepared by emulsion polymerization have been widely used as coatings, binders, and the like. The advantages in application as well as the desirable characteristics of the coatings or films are well recognized in the coatings industry. However, the coatings industry is constantly seeking latex compositions having improved adhesion. Unfortunately, attempts made to further improve the adhesion properties of the latex often depreciate the freeze stability characteristics of the latex, i.e. the ability to withstand reduced temperatures from freezing to considerably below freezing. Under such temperature conditions, thickening or coagulation occurs rendering the latex composition useless for coating applications. Accordingly there is a continuing need in the art for latex compositions of improved adhesion having freeze stability to an extent sufficient to withstand naturally and frequently occurring low temperatures without detriment.

In accordance with the present invention latex compositions having improved adhesion and excellent freeze stability are prepared by dispersing in an aqueous medium the copolymerization product in percent by weight of (A) from about 1 to about 25 percent of ethylenically unsaturated carboxylic acid monomers having the formula:

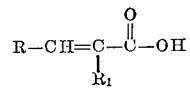

wherein each of R and $R_1$ is hydrogen, an alkyl group having 1 to 10 carbon atoms, an aryl group or halogen;

(B) about 50 to about 98 percent of at least one monovinylidene monomer selected from the cyclohexyl esters and alkyl esters of acids having the formula:

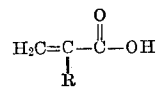

wherein R is hydrogen or a methyl group, the alkyl portion of the ester having from 1 to 12 carbon atoms, compounds of the formula:

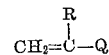

wherein R is hydrogen or methyl and Q is selected from the class consisting of the radicals —CN, —Cl and an aromatic hydrocarbon radical having from 6 to 12 carbon atoms, vinyl esters of saturated carboxylic acids having from 2 to 18 carbon atoms, diolefins having conjugated double bonds and mixtures thereof; and (C) about 1 to about 25 percent of alkyl amino-alkyl esters of an α,β-ethylenically unsaturated carboxylic acid monomer having the formula:

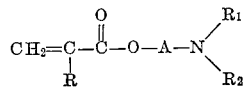

wherein R is hydrogen, an alkyl group having 1 to 4 carbon atoms or a phenyl group, A is an alkylene group having from 2 to 10 carbon atoms, $R_1$ is hydrogen or an alkyl group having 1 to 12 carbon atoms and $R_2$ is an alkyl group having 1 to 12 carbon atoms by an emulsion polymerization process which comprises the sequential steps of (1) heating an aqueous system containing a catalyzing amount of a free radical polymerization catalyst and an emulsifier in an inert atmosphere to a temperature of up to about 100° C., (2) continuously adding to the aqueous system the ethylenically unsaturated carboxylic acid monomer and at least a portion of the monomers defined in (B) above, (3) adding to the aqueous system an amount of a nitrogenous alkaline compound being sufficient to provide the aqueous system with a pH value of at least 7 and then (4) continuously adding to the aqueous system the alkyl aminoalkyl ester of an α,β-ethylenically unsaturated acid monomer (C) and any remaining portion of the monomers defined in (B) above.

Illustrative of the α,β-ethylenically unsaturated carboxylic acids which may be employed in the process of the present invention include acrylic acid, methacrylic acid, ethacrylic acid, propyl acrylic acid, isopropyl acrylic acid, alpha-chloroacrylic acid, alpha-phenyl acrylic acid, beta-phenyl acrylic acid, and crotonic acid.

Typical of the esters of acrylic acid and of methacrylic acid are methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, n-amyl methacrylate, isoamyl methacrylate, hexyl methacrylate, 2-ethylbutyl methacrylate, octyl methacrylate, 3,5,5-trimethylhexyl methacrylate, decyl methacrylate, cyclohexyl acrylate and cyclohexyl methacrylate.

Exemplary of other monovinylidene monomers (B) which may be employed in the process of the present invention are styrene, α-methylstyrene, vinyltoluene, vinylxylene, isopropylstyrene, tert-butylstyrene, ethylvinylbenzene, vinyl chloride, acrylonitrile, methacrylonitrile and the like.

Examples of vinyl esters include vinyl acetate, vinyl propionate and vinyl butyrate.

Typical examples of diolefins with conjugated double bonds include butadiene, isoprene, dimethyl butadiene, chloroprene and the like.

Illustrative examples of alkylamino alkyl esters of α,β-ethylenically unsaturated carboxylic acids include methylaminoethyl acrylate and methacrylate, dimethylaminoethyl acrylate and methacrylate, diethylaminoethyl acrylate and methacrylate, dimethylaminopropyl acrylate and methacrylate, dipropylaminoethyl acrylate and methacrylate, di-n-butylaminoethyl acrylate and methacrylate, di-sec-butylaminoethyl acrylate and methacrylate and di-t-butylaminoethyl acrylate and methacrylate.

Among the various liquid nitrogeneous compounds which may be employed as neutralizing reagents to prepare the colloidal dispersions of the present invention are concentrated ammonia, ammonium hydroxide, monoalkyl amines such as ethylamine and propylamine, monoalkanol amines such as ethanolamine and propanolamine, monocycloalkyl amines such as cyclohexylamine and monocycloalkanol amines such as cyclohexanol amine. In addition, certain strong heterocyclic monoamines are also suitable for employment as neutralizing agents, such as morpholine and pyridine. A combination of an organic base and ammonia or ammonium hydroxide is often particularly useful. However, ammonia usually gives the best results in the simplest way and is, accordingly, preferred.

In preparing the latex compositions the procedure of polymerization is one conventionally employed in the emulsion polymerization art. However, the sequence of addition of the reactants to the polymerization zone is critical to the achievement of latex compositions having improved adhesion and excellent freeze stability.

In general the latex compositions of the present invention are prepared by gradual addition of the monomer portions to the aqueous polymerization zone heated to a temperature of about 25° C. to about 100° C. containing an emulsifying agent and a free radical polymerization catalyst. The first portion of monomers added to the polymerization zone is a mixture of the ethylenically unsaturated carboxylic acid monomer and at least about 2 to about 98 percent of the monovinylidene monomer although all of the monovinylidene monomer may be changed to the polymerization zone with the carboxylic acid monomer. The mixture of carboxylic acid and monovinylidene monomers is continuously added to the polymerization zone over a period ranging from about 0 to about 180 minutes and preferably from about 45 to about 90 minutes. After the addition of the first charge of monomers the pH of the aqueous system is adjusted with a nitrogenous alkaline compound in an amount sufficient to raise the pH of the system to a value of at least 7 and preferably about 7.5 to about 8.5.

After the adjustment of the pH, a second charge of monomers consisting of the remainder of the monovinylidene component of the copolymer and the alkylamino alkyl ester of an ethylenically unsaturated carboxylic acid is then gradually added to the polymerization zone over a period of about 0 to about 180 minutes and preferably about 45 to about 90 minutes.

If the sequence of addition of the monomer portions is reversed, that is, the amino ester monomer is added first to the polymerization zone followed by the addition of the unsaturated carboxylic acid monomer, or the sequence of addition is followed but the pH of the aqueous system is not adjusted between the monomer mixture charge containing the carboxylic acid monomer and the monomer mixture charge containing the amino ester monomer, or the monomers are all added to the aqueous system at the same time, the resultant latex will contain an undesirable amount of coagulum and unreacted monomer which renders the latex practically useless from a commercial standpoint.

Emulsifiers pursuant to conventional practice are usually required for the combination of monomers employed in the present practice and to maintain the formed polymeric latexes in stable dispersions. The amounts of emulsifiers required depend primarily on the concentration of monomers to be handled and, to a further extent, with the choice of emulsifiers, monomers, and proportions of monomers. Generally, the amount of emulsifying agent required falls between about 0.1 percent and about 10.0 weight percent of the mixture of monomers.

Typical emulsifying agents which may be used include such nonionic agents as the alkyl phenoxy polyethoxyethanols having alkyl groups of about 7 to about 12 carbon atoms; polyethoxyethanol derivatives of methylene linked alkyl phenols; condensation products of ethylene oxide with higher alkyl mercaptans having alkyl groups of about 9 atoms; condensation products of ethylene oxide with alkyl thiophenols having alkyl groups of about 6 to about 15 carbon atoms; and anionic agents, such as alkali metal salts of alkyl benzene sulfonic acids and alkyl toluene sulfonic acids having aliphatic side chains of about 10 to about 15 carbon atoms and the like.

As polymerization catalysts, there may be used one or more peroxides which are known to act as free-radical catalysts and which are water soluble. Usually convenient are the persulfates (including ammonium, sodium and potassium persulfates), hydrogen peroxide, or the perborates or percarbonates. There may also be used organic peroxides, either alone or in addition to an inorganic peroxide compound. Typical organic peroxides include benzoyl peroxide, tert - butyl hydroperoxide, cumene peroxide, acetyl peroxide, caproyl peroxide, tert - butyl perbenzoate, tert - butyl diperphthalate, methyl ethyl ketone peroxide, and the like. The usual amount of catalyst required is roughly from about 0.1 percent to about 1.0 percent by weight as based on the weight of the monomer mixture.

When all of the monomer mixture has been added to the continuous, aqueous phase, the copolymer latex is generally allowed to further polymerize without upsetting the reaction conditions by the addition of more ingredients. This reaction period is generally referred to in emulsion polymerization processes as the digestion stage. It usually assists the attainment of the desired polymeric latex in good yield.

This digestion stage is usually continued for approximately 0.25 to 3.0 hours. It may be most conveniently performed while maintaining the temperature within a range of from about 25° to about 100° C.

After the digestion stage, the aqueous polymeric latex dispersion is cooled to room temperature and may be then filtered to remove any undesirable gel particles which might be formed during the polymerization.

The latex products, obtained in accordance with this invention, are useful for a number of purposes. For example, the latex dispersions are useful as, or in the preparation of, coating and impregnating compositions and the coating of films and the like. They are especially advantageous for the preparation of paints and other coatings where good adhesion and freeze stability are required.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE 1

Into a 5 liter reaction vessel equipped with an agitator, reflux condenser, dropping funnel, thermometer and inert gas line, were added the following ingredients to form an aqueous solution.

| Ingredient: | Grams |
|---|---|
| Water | 1700 |
| Anionic surfactant, sodium dodecyldiphenyl ether disulfonate (45% soln.) | 15 |
| Nonionic surfactant, nonylphenol - ethylene oxide (40 moles) reaction product | 60 |

To the aqueous solution was added 4.5 grams of $K_2S_2O_8$ along with the following monomer charge.

| Monomer Mixture A: | Grams |
|---|---|
| Ethyl acrylate | 502.5 |
| Methyl methacrylate | 236.5 |
| Acrylic acid | 7.5 |
| Methacrylic acid | 15 |

The monomer charge was continually added to the reaction vessel over a 1.5 hour period during which time the reactants were heated with stirring at 70° C. under a nitrogen blanket.

After this time the pH of the aqueous system was found to be 2.3. The pH of the system was adjusted to 8.1 with the addition of 27 milliliters of 14 percent $NH_4OH$.

The following monomer charge was then added to the reaction vessel over a period of 1.5 hours.

| Monomer Mixture B: | Grams |
|---|---|
| Ethyl acrylate | 502.5 |
| Methyl methacrylate | 236 |
| Tertiary butylaminoethyl methacrylate | 45 |

After the complete addition of monomer Mixture B the contents of the reaction vessel were digested at 70° C. for an additional 3 hours.

The resultant product was a stable, coagulant-free latex. The latex could be diluted with strong electrolyte solutions such as, solutions of NaCl, $CaCl_2$ and $$Al_2(SO_4)_3$$

without coagulation of the dispersed polymer.

The adhesion of the latex to substrates was determined by the following procedure.

On a wooden panel which had been coated with an oil based primer (A–100 exterior wood primer manufactured by Sherwin-Williams Co.) and dried for at least 48 hours, was brushed a film of the latex. The latex coated panel was air dried for at least 48 hours. To the dried film was added about 1 milliliter of distilled water and the wet topcoat was rubbed with the tip of a laboratory spatula in an attempt to peel the topcoat from the primer. It required 15 minutes to peel the topcoat prepared from the above prepared latex off the wood panel according to this test.

The freeze stability of the latex was determined by the following procedure.

A sample of the above prepared latex was placed in a covered bottle and the bottle was placed in a refrigerated compartment for 18 hours at $-15°$ C. After 18 hours, the bottle was removed and the frozen contents were permitted to thaw at 24° C. When the contents reached 24° C. they were observed for coagulation. The contents were then resubjected to the same procedure until coagulation occurred. To be commercially acceptable the latex must undergo at least 4 such cycles without coagulation. The above prepared latex completed 5 freeze-thaw cycles without coagulation and the test was stopped at that point.

By way of contrast, the latex preparation procedure of Example 1 was repeated with the exception that the pH was not adjusted between the addition of the separate monomer charges. By following this procedure excessive coagulation occurred during the addition of monomer mixture B to the reaction vessel. Shortly after the addition of monomer mixture B was completed, the agitator used for mixing stopped because of excessive coagulation in the reaction vessel.

By way of further contrast the procedure of Example 1 was substantially repeated with the exception that the order of addition of the monomer mixture portions was reversed, that is monomer mixture B was added to monomer mixture A. The resultant latex was coagulated and contained a high percentage of unreacted monomers. No neutralizing agent was added between the monomer mixture additions as the pH of the aqueous system containing monomer mixture B was above 7.

By way of still further contrast the procedure of Example 1 was substantially repeated with the exception that all monomers were added continually to the reaction vessel at the same time in accordance with the following recipe.

Latex recipe

| Ingredient: | Grams |
|---|---|
| Water | 1700 |
| Sodium dodecyldiphenyl ether disulfonate (45% soln.) | 15 |
| Nonylphenol-ethylene oxide (40 moles) reaction product | 90 |
| $K_2S_2O_8$ | 4.5 |
| Ethyl acrylate | 960 |
| Methyl methacrylate | 472.5 |
| Acrylic acid | 7.5 |
| Methacrylic acid | 15 |
| Tertiary butylaminoethyl acrylate | 45 |

The mixture of monomers was continually added to the reaction vessel over a period of 3 hours at 70° C. and the contents digested for an additional 3 hours. The latex obtained contained 25 percent coagulant by weight.

EXAMPLE 2

A latex was prepared according to the procedure of Example 1 except that dimethylaminoethyl methacrylate was substituted for the t-butylaminoethyl methacrylate.

The resultant product was a stable, coagulant-free latex. The latex could be diluted with strong electrolyte solutions such as solutions of NaCl, $CaCl_2$ and $Al_2(SO_4)_3$ without coagulation of the dispersed polymer.

It required 6 minutes to remove a topcoat prepared from the latex from a wood panel coated with an oil based primer in accordance with the adhesion test described in Example 1.

The latex was able to undergo at least 5 freeze-thaw cycles in accordance with the freeze stability test described in Example 1 without coagulation.

EXAMPLE 3

A latex was prepared according to the procedure of Example 1 using the following monomer charges.

Monomer mixture A

| Components: | Grams |
|---|---|
| Ethyl acrylate | 975 |
| Methyl methacrylate | 487.5 |
| Acrylic acid | 7.5 |

Monomer mixture B

| Component: | |
|---|---|
| Tertiary butylaminoethyl methacrylate | 15 |

Monomer mixture A was added to the polymerization zone over a period of 2 hours and 50 minutes, after which time 32 milliliters of 14 percent of NH₄OH was added to adjust the pH to 8.5. After adjustment of the pH, monomer mixture B was continuously added to the polymerization zone over a 10 minute time period. The reactants were then digested at 70° C. for 3 hours.

The resultant product was a stable, coagulant-free latex. The latex could be diluted with strong electrolyte solutions such as solutions of NaCl, CaCl₂ and Al₂(SO₄)₃ without coagulation of the dispersed polymer.

It required 6 minutes to remove a topcoat prepared from the latex from a wood panel coated with an oil base primer in accordance with the adhesion test described in Example 1.

The latex was able to undergo at least 5 freeze-thaw cycles in accordance with the freeze stability test described in Example 1 without coagulation.

By way of contrast, the procedure of Example 3 was substantially repeated whereby the following amounts of reactants were continually added to the reaction vessel at the same time to prepare a latex:

| | Grams |
|---|---|
| Ethyl acrylate | 1,005 |
| Methyl methacrylate | 435 |
| Tertiary butylaminoethyl methacrylate | 60 |

No attempt was made to adjust the pH of the reaction mixture.

The resultant product designated as Latex A was a coagulant free latex which was stable to the addition of strong electrolyte solutions and 10 minutes were required to remove a topcoat prepared from the latex in accordance with the adhesion test described in Example 1. However, the latex coagulated after 1 freeze thaw cycle when tested in accordance with the freeze stability test described in Example 1.

By way of further contrast, the procedure of Example 3 was substantially repeated whereby the following amounts of reactants were continuously added to the reaction vessel at the same time to prepare a latex:

| | Grams |
|---|---|
| Ethyl acrylate | 1,005 |
| Methyl methacrylate | 472.5 |
| Methacrylic acid | 15 |

No attempt was made to adjust the pH of the reaction mixture.

The resultant product designated as Latex B was a coagulant free latex which was stable to the addition of strong electrolyte solutions. The latex was able to undergo at least 5 freeze-thaw cycles in accordance with the freeze stability test described in Example 1 without coagulation. However, it required only 2 minutes to remove a topcoat prepared from the latex from a wood panel coated with an oil based primer in accordance with the adhesion test described in Example 1.

By way of still further contrast equal parts of Latex A and Latex B were blended together.

The resultant product was a coagulant-free latex which was stable to the addition of strong electrolyte solution. However, only 2 minutes were required to remove a topcoat prepared from the latex in accordance with the adhesion test described in Example 1 and the latex coagulated after 1 freeze-thaw cycle when tested in accordance with the freeze stability test described in Example 1.

EXAMPLE 4

The procedure of Example 1 was repeated to prepare a latex using the following recipe.

| Component: | Grams |
|---|---|
| Water | 1,750 |
| Sodium dodecyldephenyl ether disulfonate (45% soln.) | 15 |
| Nonylphenol-ethylene oxide (40 moles) reaction product | 85 |
| K₂S₂O₈ | 4.5 |

Monomer mixture A

| | |
|---|---|
| Ethyl acrylate | 903 |
| Styrene | 424.5 |
| Acrylic acid | 7.5 |
| Methacrylic acid | 15 |

Monomer mixture B

| | |
|---|---|
| Ethyl acrylate | 102 |
| Styrene | 48 |
| Tertiary butylaminoethyl methacrylate | 45 |

Thirty-one milliliters of 14 percent NH₄OH was added after the addition of monomer mixture A to the reaction vessel and before the addition of monomer mixture B.

The resultant product was a stable, coagulant-free latex. The latex could be diluted with strong electrolyte solutions such as solutions of NaCl, CaCl₂ and Al₂(SO₄)₃ without coagulation of the dispersed polymer.

It required 14 minutes to remove a topcoat prepared from the latex from a wood panel coated with an oil based primer in accordance with the adhesion test described in Example 1.

The latex was able to undergo at least 5 freeze-thaw cycles in accordance with the freeze stability test described in Example 1 without coagulation.

A similar relative improvement in adhesion and freeze stability of latexes is achieved when equivalent amounts of the other aforementioned monomers are substituted for the monomers used in the foregoing examples in the same sequence of addition to the polymerization zone in accordance with the process of the present invention.

What is claimed is:

1. An emulsion polymerization process for preparing an aqueous dispersion of a polymeric latex comprising the copolymerization product, in percent by weight, of
   (A) from about 1 to about 25 percent of an ethylenically unsaturated carboxylic acid monomer having the formula:

$$R-CH=C-\overset{O}{\underset{R_1}{C}}-OH$$

wherein R and R₁ are selected from the group consisting of hydrogen, an alkyl group having 1 to 10 carbon atoms, an aryl group and a halogen;
   (B) about 50 to about 98 percent of at least one monovinylidene monomer selected from the group consisting of cyclohexyl esters and alkyl esters of acids having the formula:

$$H_2C=C-\overset{O}{\underset{R}{C}}-OH$$

wherein R is selected from the group consisting of hydrogen and methyl groups, the alkyl portion of the ester having from 1 to 12 carbon atoms, compounds of the formula:

$$CH_2=\overset{R}{\underset{}{C}}-Q$$

wherein R is selected from the group consisting of hydrogen and methyl and Q is selected from the class consisting of the radicals —CN, —Cl and an aromatic hydrocarbon radical having from 6 to 12 carbon atoms, a vinyl ester of a saturated carboxylic acid having from 2 to 18 carbon atoms, diolefins having conjugated double bonds and mixtures thereof; and
   (C) about 1 to about 25 percent of an alkyl aminoalkyl ester of an α,β-ethylenically unsaturated carboxylic acid monomer having the formula:

$$CH_2=C-\overset{O}{\underset{R}{C}}-O-A-N\overset{R_1}{\underset{R_2}{\diagup\diagdown}}$$

wherein R is selected from the group consisting of hydrogen, an alkyl group having 1 to 4 carbon atoms and a phenyl group, A is an alkylene group having from 2 to 10 carbon atoms, $R_1$ is selected from the group consisting of hydrogen and an alkyl group having 1 to 12 carbon atoms and $R_2$ is an alkyl group having 1 to 12 carbon atoms, said process comprising the sequential steps of (1) heating an aqueous system containing a catalyzing amount of a free radical polymerization catalyst and an emulsifier in an inert atmosphere to a temperature of up to about 100° C., (2) continuously adding to the aqueous system the ethylenically unsaturated carboxylic acid monomer and at least a portion of the monomers defined in (B) above, (3) adding to the aqueous system an amount of a nitrogenous alkaline compound being sufficient to provide the aqueous system with a pH value of at least 7 and then (4) continuously adding to the aqueous system the alkylaminoalkyl ester of an $\alpha,\beta$-ethylenically unsaturated acid monomer and any remaining portion of the monomers defined in (B) above.

2. The process of claim 1 wherein the ethylenically unsaturated carboxylic acid is acrylic acid.

3. The process of claim 1 wherein the ethylenically unsaturated carboxylic acid is methacrylic acid.

4. The process of claim 1 wherein the monovinylidene monomer is ethyl acrylate.

5. The process of claim 1 wherein the monovinylidene monomer is methyl methacrylate.

6. The process of claim 1 wherein the monovinylidene monomer is styrene.

7. The process of claim 1 wherein the alkyl aminoalkyl ester of an $\alpha,\beta$-ethylenically unsaturated carboxylic acid monomer is dimethylaminoethyl methacrylate.

8. The process of claim 1 wherein the alkyl aminoalkyl ester of an $\alpha,\beta$-ethylenically unsaturated carboxylic acid monomer is tertiary-butylaminoethyl methacrylate.

9. The process of claim 1 wherein the nitrogenous alkaline compound is ammonium hydroxide.

References Cited

UNITED STATES PATENTS

| | | | |
|---|---|---|---|
| 3,282,876 | 11/1966 | Williams et al. | 260—29.6 |
| 3,296,167 | 1/1967 | Turner et al. | 260—29.6 |

MURRAY TILLMAN, *Primary Examiner.*

W. J. BRIGGS, *Assistant Examiner.*